US008875691B1

(12) United States Patent
   Saint Joy

(10) Patent No.: US 8,875,691 B1
(45) Date of Patent: Nov. 4, 2014

(54) STOVE SYSTEM WITH REMOTE CONTROL AND TEMPERATURE INDICATORS

(76) Inventor: Jean G. Saint Joy, Miami, FL (US)

( * ) Notice: Subject to any disclaimer, the term of this patent is extended or adjusted under 35 U.S.C. 154(b) by 884 days.

(21) Appl. No.: 12/970,233

(22) Filed: Dec. 16, 2010

(51) Int. Cl.
   *G05D 23/19* (2006.01)
   *F24C 15/32* (2006.01)

(52) U.S. Cl.
   USPC ... 126/39 BA; 126/198; 126/200; 126/273 R; 126/221; 219/221; 219/450; 219/449; 700/299; 700/300

(58) Field of Classification Search
   CPC ......... G05D 231/19; G05D 23/00; H05B 1/02
   USPC .......... 126/39 BA, 273 R, 198, 200; 219/506, 219/720, 715; 700/299, 300
   See application file for complete search history.

(56) References Cited

U.S. PATENT DOCUMENTS

| 4,131,786 | A | * | 12/1978 | Cooper | 219/487 |
|---|---|---|---|---|---|
| 5,321,229 | A | | 6/1994 | Holling et al. | |
| 5,945,017 | A | * | 8/1999 | Cheng et al. | 219/446.1 |
| 6,080,972 | A | | 6/2000 | May | |
| D430,451 | S | | 9/2000 | Bordet | |
| 6,137,095 | A | | 10/2000 | Kashimoto et al. | |
| 6,294,994 | B1 | * | 9/2001 | Hoellerich | 340/540 |
| 6,730,890 | B2 | | 5/2004 | Kish et al. | |
| 6,809,301 | B1 | * | 10/2004 | McIntyre et al. | 219/506 |
| 7,141,258 | B2 | * | 11/2006 | Hillmann | 426/233 |
| 7,317,178 | B2 | * | 1/2008 | Cho et al. | 219/722 |
| 7,608,803 | B2 | * | 10/2009 | Jerovsek | 219/391 |
| 2007/0113838 | A1 | * | 5/2007 | Czajka et al. | 126/273 R |
| 2008/0082217 | A1 | * | 4/2008 | Sung et al. | 700/299 |

* cited by examiner

*Primary Examiner* — Steven B McAllister
*Assistant Examiner* — Nikhil Mashruwala

(57) ABSTRACT

A stove system featuring a stove component with a burner and an oven. The stove component has a stove microprocessor and a display. The stove microprocessor is adapted to calculate a temperature of the burner. The display has a temperature indicator which functions to display a relative temperature of the burner. When the burner is in a first temperature range the temperature indicator is illuminated in a first color, when the burner is in a second temperature range the temperature indicator is illuminated in a second color, when the burner is in a third temperature range the temperature indicator is illuminated in a third color, and when the burner is in a fourth temperature range the temperature indicator is illuminated in a fourth color.

8 Claims, 4 Drawing Sheets

STOVE SYSTEM WITH REMOTE CONTROL AND TEMPERATURE INDICATORS

FIELD OF THE INVENTION

The present invention is directed to a stove, more particularly to a stove with remote control and color-coded temperature indicators.

BACKGROUND OF THE INVENTION

It is often difficult to determine how hot stove burners are, either during the cooking process or after the cooking process. The present invention features a novel stove system with color-coded temperature indicators to indicate how hot the burners are. For example, if the burners are hot, an indicator would be illuminated in red. The system of the present invention also features a remote control for remote operation of the stove, as well as temperature programming and an automatic shut-off component.

Any feature or combination of features described herein are included within the scope of the present invention provided that the features included in any such combination are not mutually inconsistent as will be apparent from the context, this specification, and the knowledge of one of ordinary skill in the art. Additional advantages and aspects of the present invention are apparent in the following detailed description and claims.

SUMMARY

The present invention features a stove system. In some embodiments, the stove system comprises a stove component a burner and an oven, the oven and burner are heated via standard methods; a control panel with a stove microprocessor, the stove microprocessor is operatively connected to the burner and oven, the stove microprocessor is adapted to calculate a temperature of the burner; and a display disposed on the stove component, the display has a temperature indicator which functions to display a relative temperature of the burner, the temperature indicator is operatively connected to the stove microprocessor.

When the burner is in a first temperature range between about 450 to 300 degrees Fahrenheit the microprocessor sends a first output signal to the temperature indicator to cause the temperature indicator to be illuminated in a first color, when the burner is in a second temperature range between about 300 to 150 degrees Fahrenheit the microprocessor sends a second output signal to the temperature indicator to cause the temperature indicator to be illuminated in a second color, when the burner is in a third temperature range between about 150 to 65 degrees Fahrenheit the microprocessor sends a third output signal to the temperature indicator to cause the temperature indicator to be illuminated in a third color, and when the burner is in a fourth temperature range between about 65 to 0 degrees Fahrenheit the microprocessor sends a fourth output signal to the temperature indicator to cause the temperature indicator to be illuminated in a fourth color.

In some embodiments, the stove component further comprises a timer. In some embodiments, the stove component further comprises a set of wheels disposed on a bottom surface of the stove component. In some embodiments, the stove component further comprises a handle. In some embodiments, the handle is pivotally attached to the stove component via a hinge. In some embodiments, the microprocessor is configured to allow the burner to be turned on to a first set temperature for a first length of time.

In some embodiments, the microprocessor is configured to allow the burner to be turned on to a first set temperature for a first length of time and subsequently a second set temperature for a second length of time. In some embodiments, the stove system further comprises a remote control with control buttons for remotely operating the stove component. In some embodiments, the first color is red. In some embodiments, the second color is orange. In some embodiments, the third color is yellow. In some embodiments, the fourth color is blue.

In some embodiments, the stove system further comprises a motion sensor adapted to detect motion, the motion sensor is operatively connected to the microprocessor and to a main breaker, wherein if the motion sensor does not detect motion for a first length of time the motion sensor sends a motion sensor input signal to the microprocessor whereupon the microprocessor causes the burner to turn off via the main breaker.

DESCRIPTION OF PREFERRED EMBODIMENTS

Figure 1:
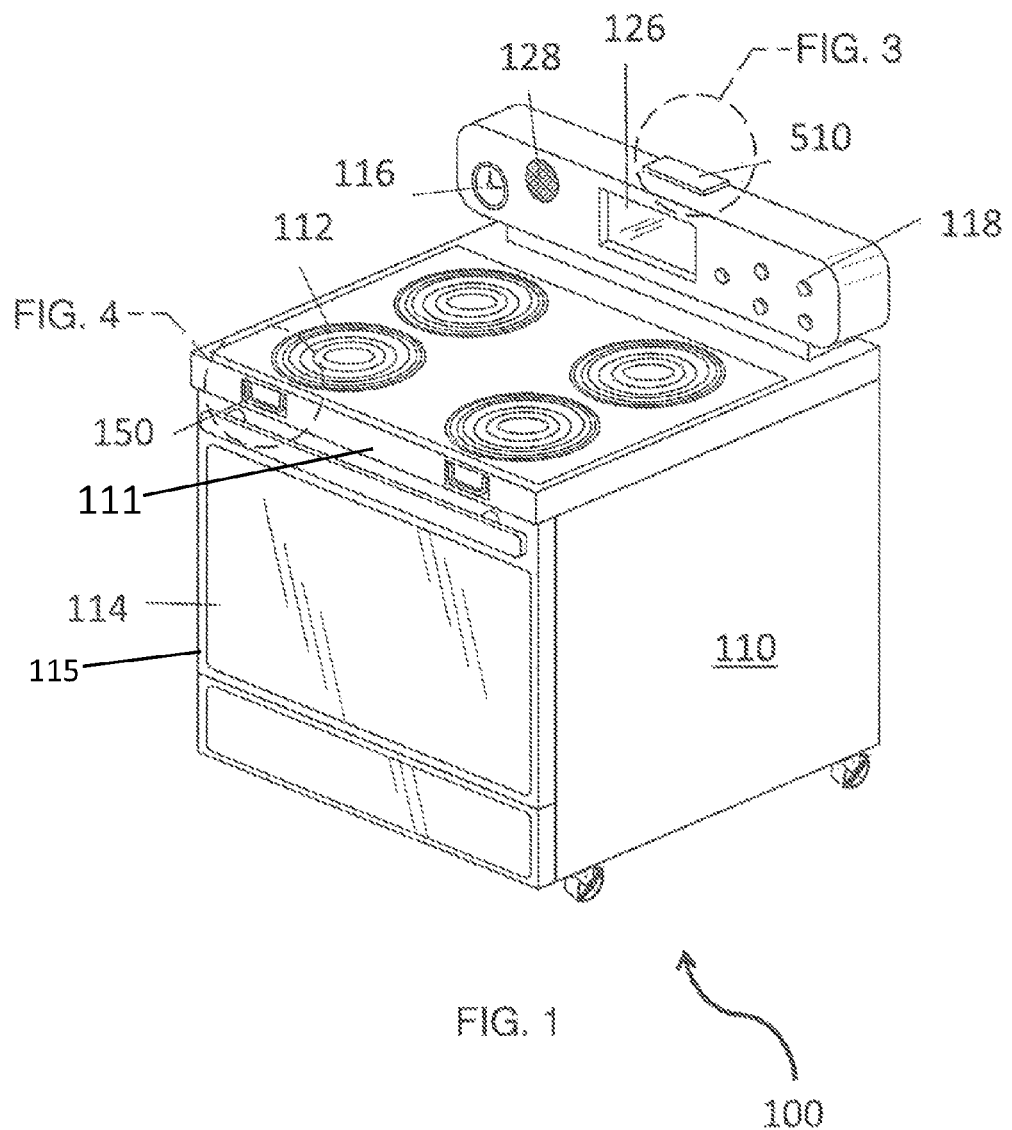
FIG. 1 is a perspective view of the stove system of the present invention.
Figure 2:
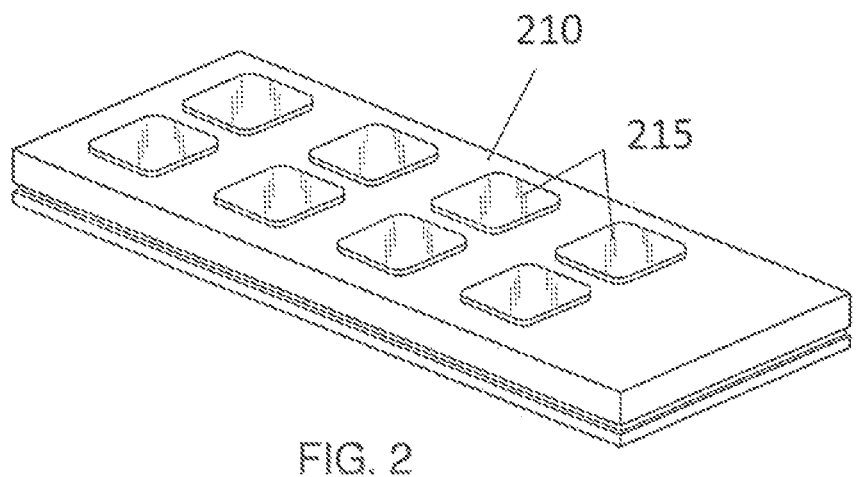
FIG. 2 is a perspective view of a remote control of the stove system of the present invention.
Figure 3:
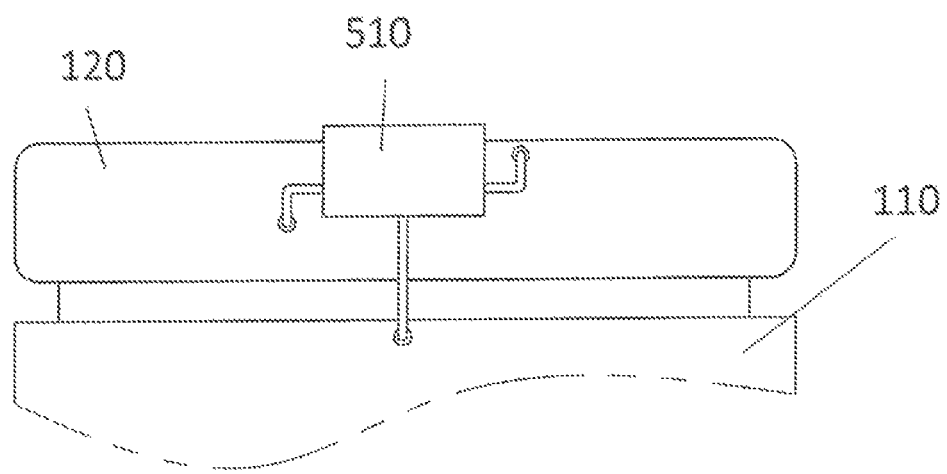
FIG. 3 is a back view of the stove system of the present invention.

Referring now to FIG. 1-5, the present invention features a novel stove system 100 with color-coded temperature indicators to indicate how hot the burners are. The stove system 100 of the present invention comprises a stove component 110 resembling a standard stove well known to one of ordinary skill in the art. For example, the stove component 110 comprises one or more burners 112 and an oven 114. The oven and burners are heated by standard methods well known to one of ordinary skill in the art. The stove component 110 also comprises standard features such as a timer 116 and other controls 118.

The stove component 110 comprises a control panel 120 with a stove microprocessor operatively connected to the burners and oven. In some embodiments, the microprocessor of the control panel 120 is configured to allow the burners and/or oven to be programmed. For example, a user may wish to heat something on a burner on high for five minutes and subsequently on low for 20 minutes. The microprocessor can be programmed to cause the burner to be activated on high for five minutes then low for 20 minutes, for example.

Figure 4:
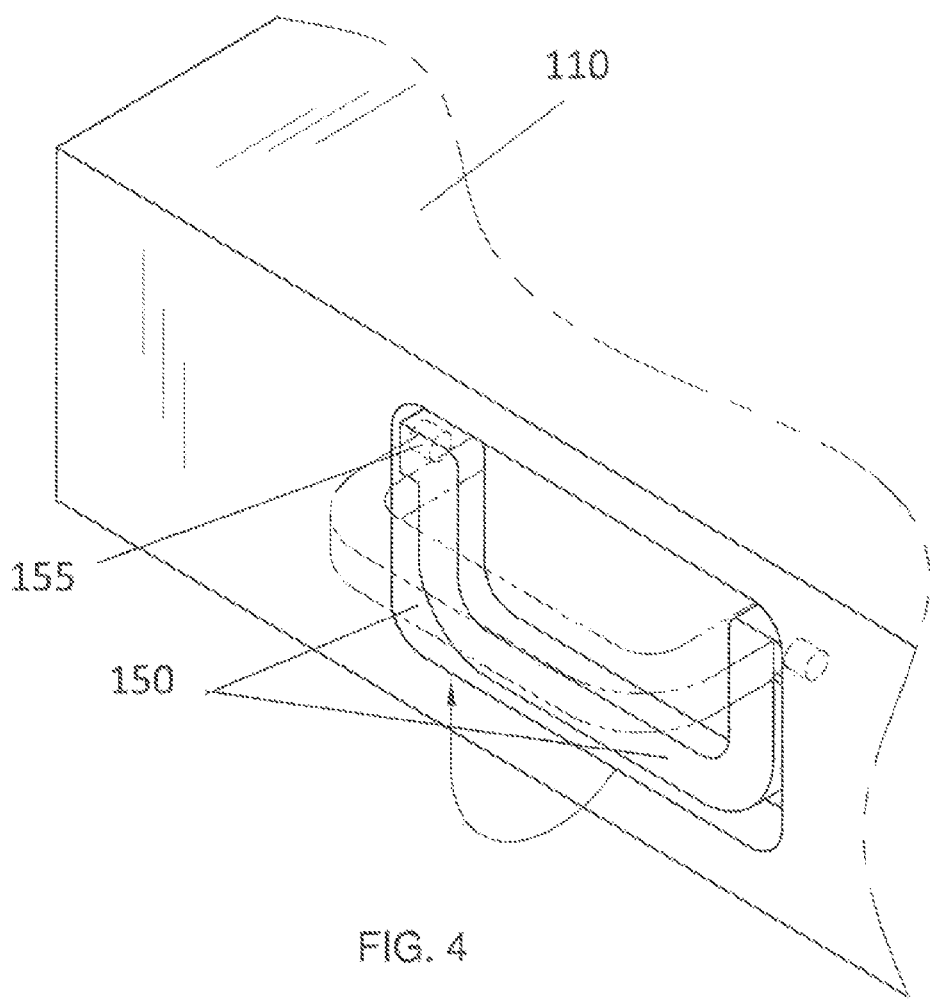
FIG. 4 is a detailed view of a handle of the stove system of the present invention.
Figure 5:
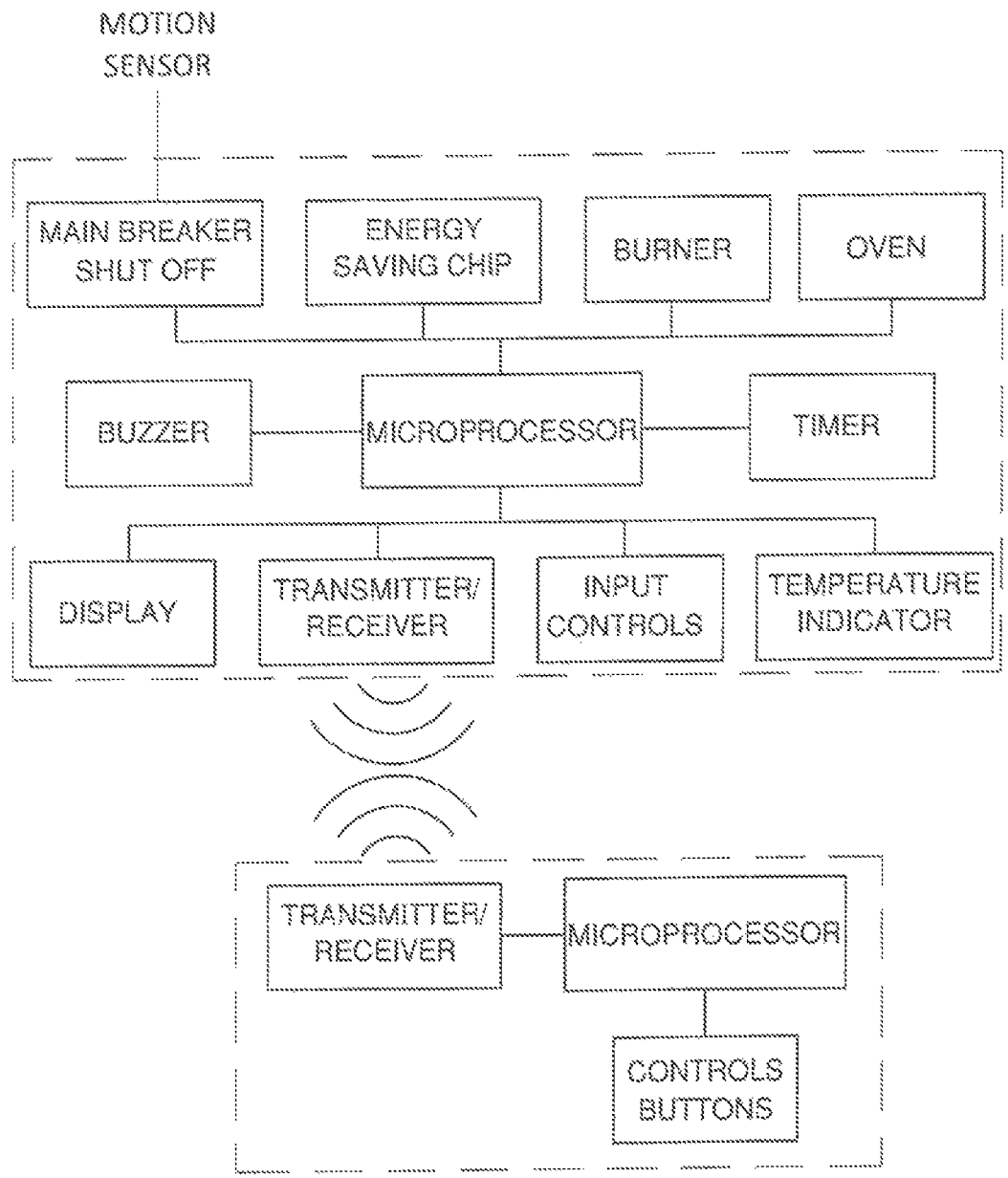
FIG. 5 is a schematic representation of electrical components of the stove system of the present invention.

In some embodiments, a set of wheels 140 is disposed on the bottom surface of the stove component 110. The wheels 140 allow a user to easily move the stove system 100 from one place to another. In some embodiments, one or more handles 150 are disposed on the stove component 110. FIG. 4 shows an example of a handle 150 pivotally attached to the stove component 110 via a hinge 155.

The burners are each operatively connected to the stove microprocessor, which is operatively connected to a set of temperature indicators. The temperature indicators are for displaying how hot the burners are. Each temperature indicator comprises at least one indicator light, which can be colored in various colors. The indicator lights may be shown in a display 126, for example. In some embodiments, if the burner is in a first temperature range, for example between about 450 to 300 degrees Fahrenheit, the light component is illuminated a first color (e.g., red). If the burner is in a second temperature range, for example between about 300 to 150 degrees Fahrenheit, the light component is illuminated a second color (e.g., orange). If the burner is in a third temperature range, for example between about 150 to 65 degrees Fahrenheit, the light component is illuminated a third color (e.g., yellow). If the burner is in a fourth temperature range, for example between about 65 to 0 degrees Fahrenheit, the light component is illuminated a fourth color (e.g., blue).

The system 100 of the present invention also comprises a remote control 210 with control buttons 215 for remotely operating the stove component 110. Remote controls, particularly remote controls for stoves, are well known to one of ordinary skill in the art. For example, the remote control comprises a transmitter operatively connected to a remote control microprocessor, which is operatively connected to the control buttons 215. The transmitter is adapted to communicate with a receiver operatively connected to the stove microprocessor.

In some embodiments, the system 100 of the present invention further comprises an automatic shut-off feature. For example, the main breaker 510 may shut off the stove system 100 if food is left unattended. The system 100 can detect if food is left unattended via a motion sensor. For example, if the motion sensor does not detect motion for a certain length of time (e.g., 20 minutes), the motion sensor causes the system to shut down automatically.

In some embodiments, the system 100 further comprises an alarm component (e.g., a buzzer 128) for alerting a user if a problem arises. This can help prevent injuries and fires, for example.

The disclosures of the following U.S. patents are incorporated in their entirety by reference herein: U.S. Pat. No. 4,131,786; U.S. Pat. No. 5,321,229; U.S. Pat. No. 6,730,890; U.S. Pat. No. 6,137,095; U.S. Pat. No. 6,080,972; U.S. Design Pat. No. D430,451.

Various modifications of the invention, in addition to those described herein, will be apparent to those skilled in the art from the foregoing description. Such modifications are also intended to fall within the scope of the appended claims. Each reference cited in the present application is incorporated herein by reference in its entirety.

Although there has been shown and described the preferred embodiment of the present invention, it will be readily apparent to those skilled in the art that modifications may be made thereto which do not exceed the scope of the appended claims. Therefore, the scope of the invention is only to be limited by the following claims.

The reference numbers recited in the below claims are solely for ease of examination of this patent application, and are exemplary, and are not intended in any way to limit the scope of the claims to the particular features having the corresponding reference numbers in the drawings.

What is claimed is:

1. A stove system comprising:
   (a) a stove component, a burner and an oven having an over door;
   (b) a control panel with a stove microprocessor, the stove microprocessor is operatively connected to the burner and oven, the stove microprocessor is adapted to calculate a temperature of the burner;
   (c) a display disposed on the stove component, the display has a temperature indicator which functions to display a temperature of the burner, the temperature indicator is operatively connected to the stove microprocessor;
   (d) a timer;
   (e) a set of wheels disposed on a bottom surface of the stove component 110;
   (f) a handle disposed on a top front lip of the stove component, wherein the handle is not attached to the oven door, wherein the handle is pivotally attached to the stove component via a hinge, wherein the handle pivots upward and is pulled upon such that the set of wheels roll and the stove component is moveable;
   (g) a wireless remote control separate from the control panel, wherein the wireless remote control has control buttons for remotely operating the stove component; and
   (h) a motion sensor adapted to detect motion, the motion sensor is operatively connected to the microprocessor and to a main breaker, wherein if the motion sensor does not detect motion for a first length of time the motion sensor sends a motion sensor input signal to the microprocessor whereupon the microprocessor causes the burner to turn off via the main breaker wherein when the burner is in a first temperature range between about 450 to 300 degrees Fahrenheit the microprocessor sends a first output signal to the temperature indicator to cause the temperature indicator to be illuminated in a first color, when the burner is in a second temperature range between about 300 to 150 degrees Fahrenheit the microprocessor sends a second output signal to the temperature indicator to cause the temperature indicator to be illuminated in a second color, when the burner is in a third temperature range between about 150 to 65 degrees Fahrenheit the microprocessor sends a third output signal to the temperature indicator to cause the temperature indicator to be illuminated in a third color, and when the burner is in a fourth temperature range between about 65 to 0 degrees Fahrenheit the microprocessor sends a fourth output signal to the temperature indicator to cause the temperature indicator to be illuminated in a fourth color.

2. The stove system of claim 1, wherein the microprocessor is configured to allow the burner to be turned on to a first set temperature for a first length of time.

3. The stove system of claim 1, wherein the microprocessor is configured to allow the burner to be turned on to a first set temperature for a first length of time and subsequently a second set temperature for a second length of time.

4. The stove system of claim 1, wherein the first color is red.

5. The stove system of claim 1, wherein the second color is orange.

6. The stove system of claim 1, wherein the third color is yellow.

7. The stove system of claim 1, wherein the fourth color is blue.

8. A stove system consisting of:
   (a) a stove component, a burner and an oven having an oven door;
   (b) a control panel with a stove microprocessor, the stove microprocessor is operatively connected to the burner and oven, the stove microprocessor is adapted to calculate a temperature of the burner;
   (c) a display disposed on the stove component, the display has a temperature indicator which functions to display a temperature of the burner, the temperature indicator is operatively connected to the stove microprocessor;
   (d) a timer;
   (e) a set of wheels disposed on a bottom surface of the stove component;

(f) a handle disposed on a top front lip of the stove component, wherein the handle is not attached to the oven door, wherein the handle is pivotally attached to the stove component via a hinge, wherein the handle pivots upward and is pulled upon such that the set of wheels roll and the stove component is moveable;

(g) a wireless remote control separate from the control panel, wherein the wireless remote control has control buttons for remotely operating the stove component; and (h) a motion sensor adapted to detect motion, the motion sensor is operatively connected to the microprocessor and to a main breaker, wherein if the motion sensor does not detect motion for a first length of time the motion sensor sends a motion sensor input signal to the microprocessor whereupon the microprocessor causes the burner to turn off via the main breaker wherein when the burner is in a first temperature range between about 450 to 300 degrees Fahrenheit the microprocessor sends a first output signal to the temperature indicator to cause the temperature indicator to be illuminated in a first color, when the burner is in a second temperature range between about 300 to 150 degrees Fahrenheit the microprocessor sends a second output signal to the temperature indicator to cause the temperature indicator to be illuminated in a second color, when the burner is in a third temperature range between about 150 to 65 degrees Fahrenheit the microprocessor sends a third output signal to the temperature indicator to cause the temperature indicator to be illuminated in a third color, and when the burner is in a fourth temperature range between about 65 to 0 degrees Fahrenheit the microprocessor sends a fourth output signal to the temperature indicator to cause the temperature indicator to be illuminated in a fourth color.

* * * * *